US012691517B2

(12) United States Patent
Tomioka et al.

(10) Patent No.: US 12,691,517 B2
(45) Date of Patent: Jul. 28, 2026

(54) SEALING DEVICE AND WIRE ELECTRICAL DISCHARGE MACHINE

(71) Applicant: FANUC CORPORATION, Minamitsuru-gun (JP)

(72) Inventors: Ryuunosuke Tomioka, Yamanashi-ken (JP); Hisanori Kouda, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 825 days.

(21) Appl. No.: 18/014,024

(22) PCT Filed: Jul. 8, 2021

(86) PCT No.: PCT/JP2021/025789
§ 371 (c)(1),
(2) Date: Dec. 30, 2022

(87) PCT Pub. No.: WO2022/009953
PCT Pub. Date: Jan. 13, 2022

(65) Prior Publication Data
US 2023/0286071 A1    Sep. 14, 2023

(30) Foreign Application Priority Data

Jul. 10, 2020    (JP) ................................ 2020-118907

(51) Int. Cl.
*B23H 7/02*        (2006.01)
*B23H 7/10*        (2006.01)
(52) U.S. Cl.
CPC ......... *B23H 7/105* (2013.01); *B23H 2500/00* (2013.01)

(58) Field of Classification Search
CPC .... B23H 7/105; B23H 2500/00; B23H 11/00; B23H 7/02
See application file for complete search history.

(56) References Cited

U.S. PATENT DOCUMENTS 4,918,279 A      4/1990  Babel et al.
5,028,757 A  *  7/1991  Aramaki ................. B23H 7/02
                                                              219/69.12
(Continued)

FOREIGN PATENT DOCUMENTS

CN        1290568 A      4/2001
CN        2635266 Y      8/2004
CN        2637069 Y      9/2004
(Continued)

OTHER PUBLICATIONS

Communication issued Mar. 7, 2025 in Chinese Application No. 202180048943.X.
(Continued)

*Primary Examiner* — Tiffany T Tran
(74) *Attorney, Agent, or Firm* — Sughrue Mion, PLLC

(57) ABSTRACT

A sealing device and a wire electrical discharge machine that may reduce sludge deposition, include a seal base, a seal plate, a bellows member, a flow passage, and a guide rail member. The guide rail member is open on the inward direction side thereof to cause sludge generated by machining of an object to be machined to flow into a machining tank along with a machining liquid supplied between the bellows member and the seal plate.

6 Claims, 6 Drawing Sheets

(56) References Cited

U.S. PATENT DOCUMENTS

| | | | | | |
|---|---|---|---|---|---|
| 5,196,666 | A | | 3/1993 | Hosaka | |
| 2013/0056445 | A1 | * | 3/2013 | Yamasaki | ................ B23H 7/02 |
| | | | | | 219/69.11 |

FOREIGN PATENT DOCUMENTS

| | | | | | | |
|---|---|---|---|---|---|---|
| CN | 202158202 | U | | 3/2012 | | |
| CN | 106041541 | A | * | 10/2016 | ............. | B23Q 1/017 |
| CN | 106884651 | A | * | 6/2017 | ............. | E04C 5/122 |
| CN | 208426083 | U | | 1/2019 | | |
| CN | 208866542 | U | | 5/2019 | | |
| CN | 110168240 | A | | 8/2019 | | |
| CN | 209856382 | U | | 12/2019 | | |
| CN | 210254597 | U | | 4/2020 | | |
| CN | 210360548 | U | | 4/2020 | | |
| JP | H 01-306130 | A | | 12/1989 | | |
| JP | H 07-060550 | A | | 3/1995 | | |
| JP | 2001-105236 | A | | 4/2001 | | |
| JP | 2001-300820 | A | | 10/2001 | | |
| JP | 2002-046025 | A | | 2/2002 | | |
| JP | 2006-035370 | A | | 2/2006 | | |
| JP | 2013-052497 | A | | 3/2013 | | |
| WO | WO 95/05915 | A1 | | 3/1995 | | |

OTHER PUBLICATIONS

Communication dated Feb. 14, 2025 in Taiwanese Application No. 110125056.
International Search Report (ISR) (PCT Form PCT/ISA/210), in PCT/JP2021/025789, dated Sep. 7, 2021.

* cited by examiner

SEALING DEVICE AND WIRE ELECTRICAL DISCHARGE MACHINE

TECHNICAL FIELD

The present invention relates to a sealing device for sealing a window portion formed in a side wall of a work pan, and a wire electrical discharge machine including the sealing device.

BACKGROUND ART

The wire electrical discharge machine generates electric discharge between a wire electrode and a workpiece disposed inside a work pan to thereby machine the workpiece. The wire electrode is supported by an upper arm and a lower arm. The work pan is movable relative to a machine base in each of a first direction (X-direction) and a second direction (Y-direction) intersecting the first direction. The work pan has a window portion formed in a side wall thereof and through which the lower arm is inserted.

JP 2013-052497 A discloses a sealing device for sealing a window portion of a work pan. In JP 2013-052497 A, a seal base and a seal plate are provided. The seal base is fixed to an outer surface of the work pan. The seal base has a through hole communicating with the window portion of the work pan. The seal plate closes the through hole of the seal base from the outer surface side of the seal base. The seal plate is movable relative to the seal base. The lower arm that is inserted through the window portion of the work pan and the through hole of the seal base penetrates through the seal plate. The seal plate is provided with a seal member that seals a gap between the lower arm (arm cover) and the seal plate.

In JP 2013-052497 A, a pre-sealing unit is provided. The pre-sealing unit suppresses adhesion of sludge (contaminant) generated by machining of a workpiece to the seal member or the like. The pre-sealing unit includes a bellows member (pre-sealing bellows cover) and a guide rail member (pre-sealing bellows rail). The bellows member is disposed so as to cover the window portion of the work pan from the inner side of the work pan. The guide rail member guides the bellows member. A working fluid having a pressure higher than the pressure in the work pan is supplied between the bellows member and the seal plate. The working fluid supplied between the bellows member and the seal plate flows out through a slight gap between the bellows member and the guide rail member. Therefore, sludge is prevented from entering between the bellows member and the seal plate. As a result, adhesion of sludge to the seal member or the like is suppressed.

SUMMARY OF THE INVENTION

However, in the case of JP 2013-052497 A, even if sludge does not enter between the bellows member and the seal plate, the sludge tends to accumulate on the guide rail member for guiding the bellows member. When the sludge accumulates on the guide rail member, there is concern that the accumulated sludge may make it difficult for the bellows member to appropriately expand and contract.

An object of the present invention is to provide a sealing device and a wire electrical discharge machine capable of suppressing accumulation of sludge.

According to a first aspect present invention, there is provided a sealing device configured to seal a window portion formed in a side wall of a work pan that stores a working fluid in which a workpiece is immersed, wherein a lower arm that supports a wire electrode configured to machine the workpiece is inserted through the window portion and the window portion is formed so as to allow the work pan to move in an intersecting direction that intersects an extending direction of the inserted lower arm, the sealing device including:

a seal base fixed to an outer surface of the work pan and including a through hole communicating with the window portion;

a seal plate configured to close the through hole from an outer surface side of the seal base and provided so as to be movable relative to the seal base;

a bellows member disposed on a side of an inward direction relative to the seal plate, so as to cover the window portion, the inward direction being a direction that extends from an outer side to an inner side of the window portion along the extending direction, the bellows member being configured to expand and contract along the intersecting direction;

a flow path configured to allow the working fluid having a pressure higher than a pressure inside the work pan, to be supplied between the bellows member and the seal plate; and a guide rail member that is disposed on a lower side of the bellows member, extends in the intersecting direction, and is configured to guide expansion and contraction of the bellows member;

wherein in the guide rail member, a side of the inward direction of the guide rail member is opened in a manner so that sludge generated by machining of the workpiece flows into the work pan together with the working fluid supplied between the bellows member and the seal plate.

According to a second aspect of the present invention, there is provided a sealing device configured to seal a window portion formed in a side wall of a work pan that stores a working fluid in which a workpiece is immersed, wherein a lower arm that supports a wire electrode configured to machine the workpiece is inserted through the window portion and the window portion is formed so as to allow the work pan to move in an intersecting direction that intersects an extending direction of the inserted lower aid, the sealing device including:

a seal base fixed to an outer surface of the work pan and including a through hole communicating with the window portion;

a seal plate configured to close the through hole from an outer surface side of the seal base and provided so as to be movable relative to the seal base;

a bellows member disposed on a side of an inward direction relative to the seal plate, so as to cover the window portion, the inward direction being a direction that extends from an outer side to an inner side of the window portion along the extending direction, the bellows member being configured to expand and contract along the intersecting direction;

a flow path configured to allow the working fluid having a pressure higher than a pressure inside the work pan, to be supplied between the bellows member and the seal plate; and a support rod that penetrates through a lower portion of the bellows member in a state in which the bellows member is allowed to expand and contract, extends in the intersecting direction, and is configured to support the bellows member.

According to a third aspect of the present invention, there is provided a wire electrical discharge machine including:

the sealing device according to the first aspect or the second aspect;

the work pan; and the arm.

According to the aspects of the present invention, accumulation of sludge can be suppressed.

That is, in the case of the first aspect, since the inward direction side of the guide rail member is opened, the working fluid supplied between the bellows member and the seal plate can be made to flow from the opened portion to the work pan. Therefore, it is possible to prevent the sludge from entering between the bellows member and the seal plate, without causing the sludge to stagnate in the guide rail member, and as a result, it is possible to prevent the accumulation of the sludge.

On the other hand, in the case of the second aspect, since the lower portion of the bellows member is supported by the support rod, the working fluid supplied between the bellows member and the seal plate can be made to flow into the work pan from below the bellows member without providing the guide rail member. Therefore, it is possible to prevent the sludge from entering between the bellows member and the seal plate, without causing the sludge to stagnate. As a result, it is possible to prevent the sludge from accumulating.

DETAILED DESCRIPTION OF THE INVENTION

Preferred embodiments of the present invention will be described in detail below with reference to the accompanying drawings.

Figure 1:
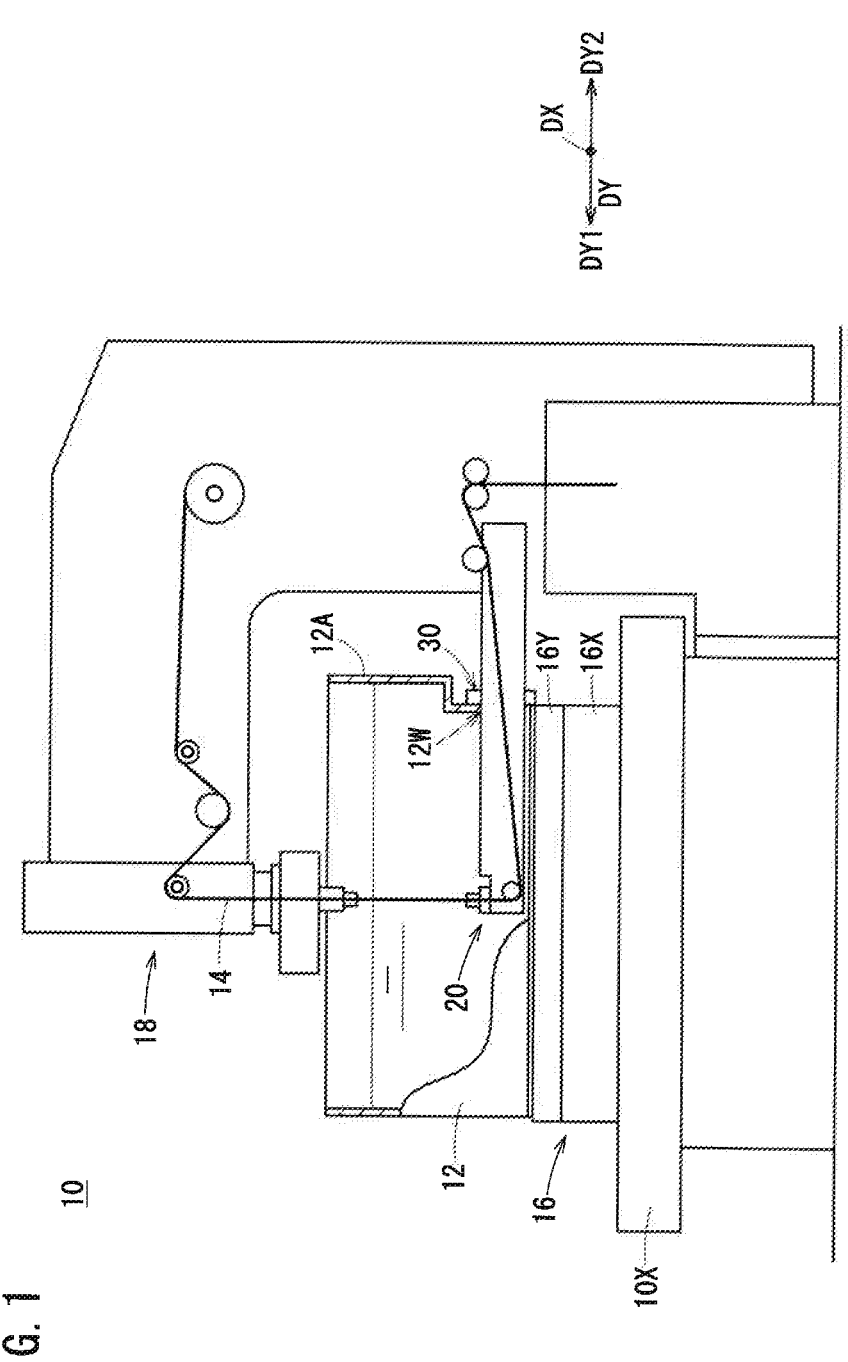
FIG. 1 is a diagram showing a configuration of a wire electrical discharge machine.

FIG. 1 is a diagram illustrating a configuration of a wire electrical discharge machine 10. The wire electrical discharge machine 10 machines a workpiece (an object to be machined) by causing electrical discharge between a wire electrode 14 and the workpiece in a working fluid stored in a work pan (a work tank) 12. The wire electrical discharge machine 10 includes a work pan 12, a movable table 16, an arm 18 on an upper side, and an arm 20 on a lower side. Hereinafter, the arm 18 is referred to as an upper arm 18, and the arm 20 is referred to as a lower arm 20.

The work pan 12 stores a liquid (a working fluid) used when machining the workpiece. The work pan 12 is provided on a movable table 16.

The movable table 16 has a saddle 16X and a table 16Y. The saddle 16X moves, in a first direction DX, relative to a machine base 10X of the wire electrical discharge machine 10. The table 16Y moves relative to the saddle 16X in a second direction DY intersecting the first direction DX. The work pan 12 is installed on the installation surface of the table 16Y. The first direction DX corresponds to the X-axis of the machine axes defined in the wire electrical discharge machine 10, and the second direction DY corresponds to the Y-axis of the machine axes.

The upper arm 18 supplies the wire electrode 14 toward the workpiece immersed in the working fluid in the work pan 12 while supporting the wire electrode 14. The upper arm 18 includes a roller or the like that feeds the wire electrode 14 while supporting the wire electrode 14.

The lower arm 20 collects the wire electrode 14 that has passed through the workpiece, while supporting the wire electrode 14. The lower arm 20 includes a roller or the like that winds up the wire electrode 14 while supporting the wire electrode 14. The lower arm 20 extends along the second direction DY.

The lower arm 20 passes through a window portion 12W formed in a side wall 12A of the work pan 12. The work pan 12 is installed on the movable table 16 (table 16Y). Therefore, when the movable table 16 moves in at least one of the first direction DX or the second direction DY, the work pan 12 moves together with the movable table 16. The window portion 12W of the work pan 12 extends in the first direction DX so that the work pan 12 can move along the first direction DX. Therefore, it is possible to prevent the lower arm 20 passing through the window portion 12W from interfering with the movement of the work pan 12 in the first direction DX.

The second direction DY coincides with the extending direction of the lower arm 20. The first direction DX coincides with an intersecting direction intersecting the extending direction of the lower arm 20. In the second direction DY, a direction from the outside to the inside of the window portion 12W along the second direction DY is defined as an inward direction DY1. In addition, in the second direction DY, a direction from the inner side to the outer side of the window portion 12W along the second direction DY is an outward direction DY2.

Next, a sealing device 30 for sealing the window portion. 12W will be described. The sealing device 30 seals the window portion 12W of the work pan 12 in a state where the work pan 12 is movable. The following description is divided into a section concerning the sealing device 30 of a first embodiment and a section concerning the sealing device 30 of a second embodiment.

First Embodiment

Figure 2:
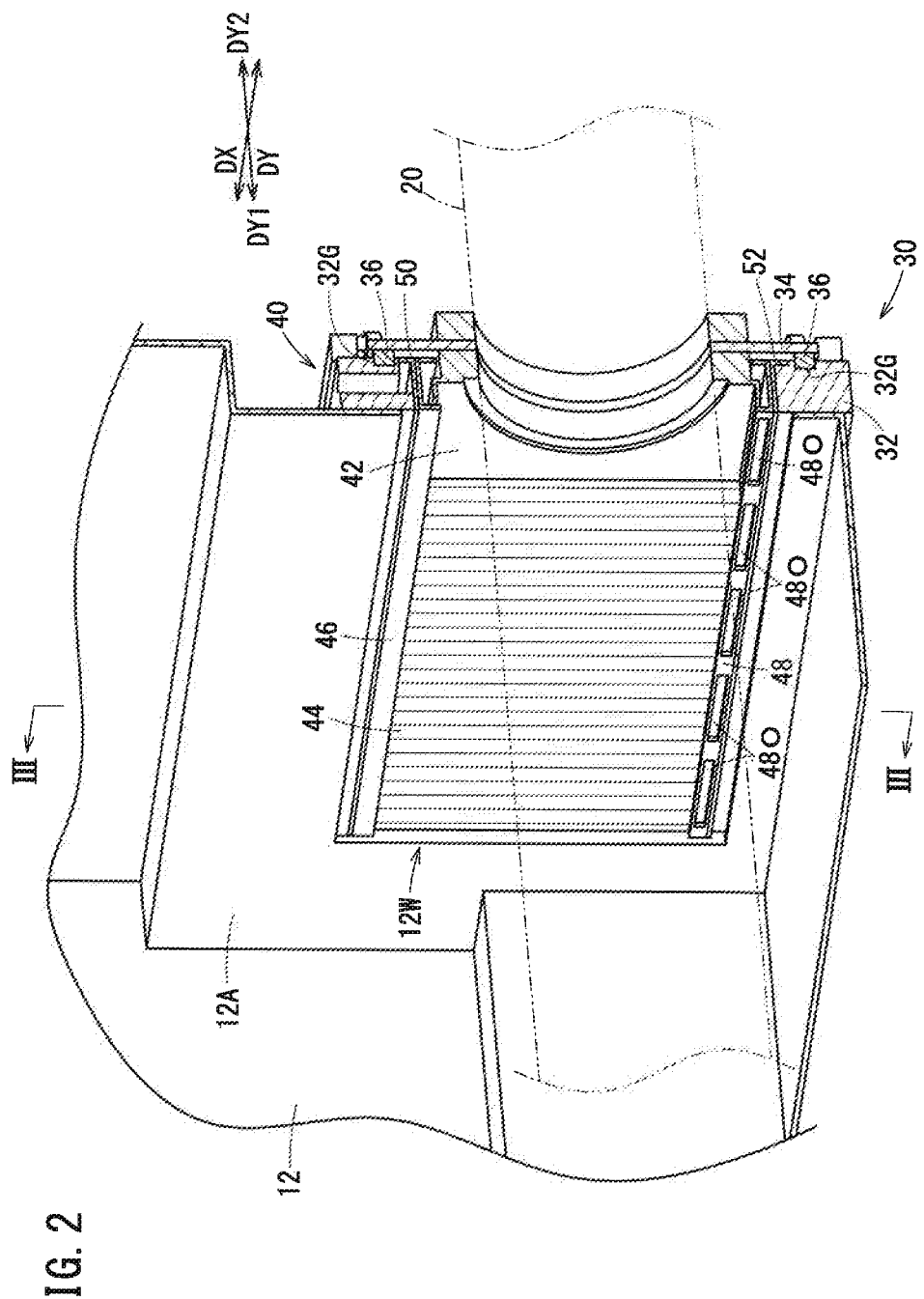
FIG. 2 is a perspective view showing a sealing device according to a first embodiment and its vicinity.
Figure 3:
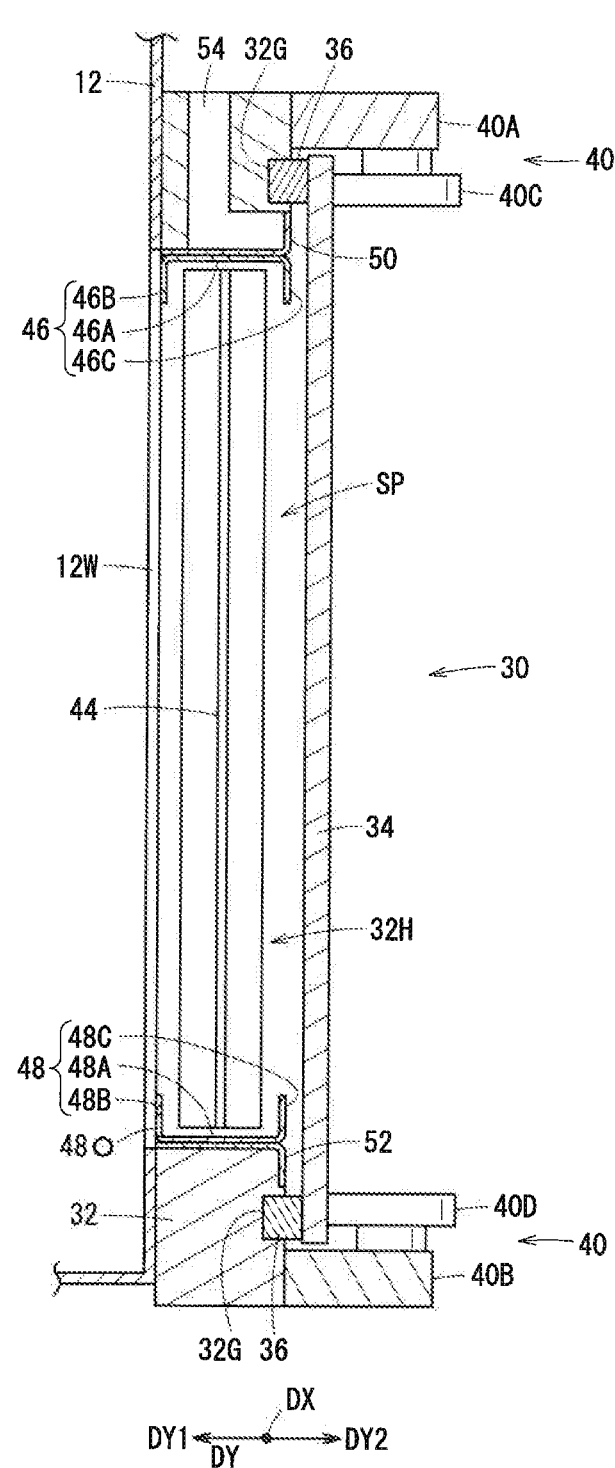
FIG. 3 is a cross-sectional view taken along line of FIG. 2.

FIG. 2 is a perspective view showing the sealing device 30 according to the first embodiment and its vicinity. FIG. 3 is a cross-sectional view taken along line of FIG. 2. The sealing device 30 includes a seal base 32 and a seal plate 34.

The seal base 32 is fixed to an outer surface of the side wall 12A where the window portion 12W is formed in the work pan 12. In order to enable movement of the work pan 12 in the first direction DX, the seal base 32 includes a through hole 32H (FIG. 3) communicating with the window portion 12W of the work pan 12. The through hole 32H is disposed so as to overlap with the window portion 12W. The through hole 32H is formed to have the same shape and size as the window portion 12W. The through hole 32H may be formed to have a larger size than the window portion 12W. Further, the through hole 32H may have a shape different from that of the window portion 12W.

The seal base 32 includes a groove 320 formed on a surface thereof opposite to a surface thereof facing the work pan 12. The groove 32G is formed so as to surround the entire periphery of the through hole 32H. A sliding portion 36 is fitted into the groove 32G. The sliding portion 36 abuts against the seal plate 34. The sliding portion 36 is fitted into the groove 32G in order that the seal plate 34 can slide. That is, the sliding portion 36 is provided so as to be slidable relative to the seal plate 34 while sealing a gap between the seal base 32 and the seal plate 34. The sliding portion 36 has elasticity. Examples of the sliding portion 36 include an elastomer such as rubber.

The seal plate 34 closes the through hole 32H of the seal base 32 from the outer surface side of the seal base 32. The seal plate 34 is supported by a support portion 40 so as to be movable relative to the seal base 32 through the sliding portion 36. The support portion 40 includes an upper seal base 40A (FIG. 3), a lower seal base 40B (FIG. 3), an upper roller 4 (FIG. 3), and a lower roller 401) (FIG. 3).

The upper seal base 40A is fixed to the seal base 32 above the through hole 32H. The upper seal base 40A extends in the outward direction DY2. The lower seal base 40B is fixed to the seal base 32 below the through hole 32H. The lower seal base 40B extends in the outward direction DY2.

The upper roller 40C is attached to the upper seal base 40A. The lower roller 40D is attached to the lower seal base 40B. The upper roller 40C and the lower roller 40D are attached to the seal base 32 in a state of pressing the seal plate 34 against the sliding portion 36. Therefore, the upper roller 40C and the lower roller 40D restrict the seal plate 34 from moving in the second direction DY and allow the seal plate 34 to move in the first direction DX relative to the seal base 32. A plurality of the upper rollers 40C and a plurality of the lower rollers 40D may be disposed at intervals in the first direction DX.

The seal plate 34 is provided with a seal member 42 (FIG. 2). The seal member 42 seals a gap between the seal plate 34 and the lower arm 20 passing through the through hole formed in the seal plate 34. The seal member 42 may seal the gap between the seal plate 34 and the lower arm 20 by using oil.

A bellows member 44 is disposed in a region that lies on the inward direction DY1 side relative to the seal plate 34. The bellows member 44 expands and contracts along the first direction DX. The bellows member 44 is disposed so as to cover the window portion 12W of the work pan 12. In the present embodiment, the bellows member 44 is located inside the through hole 32H of the seal base 32. In the present embodiment, the bellows member 44 is disposed on each of one side and the other side of the seal member 42 (FIG. 2) along the first direction DX. The seal member 42 (FIG. 2) is sandwiched between the two bellows members 44. In FIG. 2, only a bellows member 44 disposed on one side of the seal member 42 (FIG. 2) is shown. One end of each of the bellows members 44 in the first direction DX is fixed to the seal member 42. The other end of each of the bellows members 44 in the first direction DX is fixed to the seal base 32. An upper portion of each bellows member 44 is supported by a guide rail member 46. A lower portion of each bellows member 44 is supported by a guide rail member 48. Hereinafter, the guide rail member 46 will be referred to as an upper guide rail member 46 and the guide rail member 48 will be referred to as a lower guide rail member 48.

The upper guide rail member 46 is fixed to the seal base 32. The upper guide rail member 46 guides the telescopic bellows member 44. The upper guide rail member 46 has a top portion 46A, a side portion 46B and a side portion 46C. The top portion 46A is disposed above the upper portion of the bellows member 44 and extends in the first direction DX. The side portion 46B is connected to an end of the top portion 46A on the inward direction DY1 side. The side portion 46C is connected to an end of the top portion 46A on the outward direction DY2 side. The upper portion of the bellows member 44 is sandwiched between the side portion 46B and the side portion 46C.

The top portion 46A may be in contact with the inner peripheral surface of the seal base 32 or may not be in contact therewith. In this embodiment, the top portion 46A abuts against an upper sheet member 50. The upper sheet member 50 covers the inner peripheral surface of the seal base 32 and a part of a surface of the seal base 32 on the outward direction DY2 side. The upper sheet member 50 is provided on the seal base 32.

The lower guide rail member 48 is fixed to the seal base 32. The lower guide rail member 48 guides the telescopic bellows member 44. The lower guide rail member 48 has a bottom portion 48A, a side portion 48B and a side portion 48C. The bottom portion 48A is disposed below a lower portion of the bellows member 44 and extends in the first direction DX. The side portion 48B is connected to an end of the bottom portion 48A on the inward direction DY1 side. The side portion 48C is connected to an end of the bottom portion 48A on the outward direction DY2 side. The lower portion of the bellows member 44 is sandwiched between the side portion 48B and the side portion 48C.

The bottom portion 48A may be in contact with the inner peripheral surface of the seal base 32 or may not be in contact therewith. In the case of the present embodiment, the bottom portion 48A abuts against a lower sheet member 52. The lower sheet member 52 covers the inner peripheral surface of the seal base 32 and a part of a surface of the seal base 32 on the outward direction DY2 side. The lower sheet member 52 is provided on the seal base 32. Note that the lower sheet member 52 may be omitted.

An opening 48O is formed in the side portion 48W. The number of the openings 48O may be one or more. When there are a plurality of the openings 48O, the plurality of openings 48O are formed at intervals in the first direction DX. FIG. 2 shows a case where the plurality of openings 48O are provided.

In the sealing device 30, a quasi-closed space SP (FIG. 3) is formed between the seal plate 34 and the bellows members 44, The quasi-closed space SP (FIG. 3) is surrounded by the seal base 32, the seal plate 34, and the bellows members 44. The sealing device 30 is provided with a flow path 54 (FIG. 3) for supplying the working fluid to the quasi-closed space SP. The flow path 54 is formed in the seal base 32 on the upper side of the through hole 32H. The flow path 54 has an outlet port on the surface of the seal base 32 on the outward direction DY2 side. A working fluid supply source is connected to an inlet port of the flow path 54. The working fluid supply source continues to supply a working fluid to the quasi-closed space SP via the flow path 54 when the workpiece is being machined. The working fluid supplied to the quasi-closed space SP has a clean liquid quality containing no sludge.

The pressure of the working fluid supplied to the quasi-closed space SP exceeds the pressure of the working fluid present inside the work pan 12. Therefore, when the quasi-closed space SP is filled with a working fluid, the working fluid in the quasi-closed space SP flows out into the work pan 12 through a gap between the bellows members 44 and the upper guide rail member 46 and a gap between the bellows members 44 and the lower guide rail member 48. This makes it possible to prevent the working fluid in the work pan 12 from flowing back into the quasi-closed space SP filled with the working fluid having a clean fluid quality. As a result, it is possible to prevent sludge from entering the quasi-closed space SP.

Further, in the sealing device 30 of the present embodiment, the openings 48O are formed in the side portion 48B of the lower guide rail member 48. Therefore, the sludge can be flowed out into the work pan 12 without staying in the lower guide rail member 48.

Second Embodiment

Figure 4:
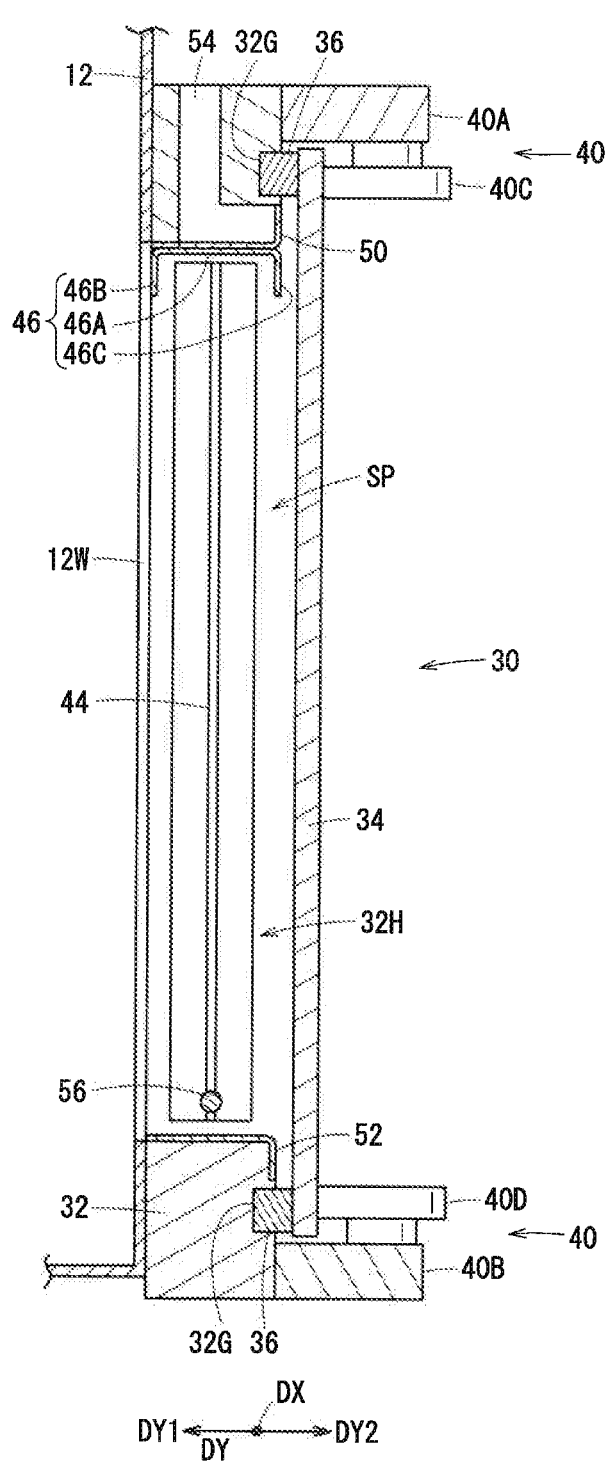
FIG. 4 is a view showing a sealing device according to a second embodiment from the same viewpoint as in FIG. 3.

FIG. 4 is a view showing a sealing device 30 according to a second embodiment from the same viewpoint as in FIG. 3. In FIG. 4, the same components as those described in the first embodiment are denoted by the same reference numerals. In the second embodiment, descriptions that overlap or are duplicative of those stated in the first embodiment are omitted.

In this embodiment, the lower guide rail member 48 is omitted, and a support rod 56 is newly provided. The support rod 56 supports a lower portion of each bellows member 44. The support rod 56 extends in the first direction DX. The support rod 56 penetrates through the lower portion of the bellows member 44 in a manner so that the bellows member 44 can expand and contract. Both ends of the support rod 56 are fixed to side surfaces on the inner peripheral side of the seal base 32. Thus, even if the lower guide rail member 48 is omitted, the bellows member 44 can be restricted from moving in the second direction DY. The cross-sectional shape of the support rod 56 is not particularly limited. In FIG. 4, the cross-sectional shape of the support rod 56 is circular. The cross-sectional shape of the support rod 56 may be a rectangular shape, a triangular shape, or the like.

In the present embodiment, when the quasi-closed space SP is filled with the working fluid, the working fluid in the quasi-closed space SP flows out into the work pan 12 through the gap between the bellows member 44 and the upper guide rail member 46 and the gap between the bellows member 44 and the lower sheet member 52. As a result, even if the lower guide rail member 48 is omitted, it is possible to suppress the sludge from entering the quasi-closed space SP, without the sludge staying on the lower side of the bellows member 44.

Modifications

At least one of the first embodiment or the second embodiment may be modified as follows.

Modification 1

Figure 5:
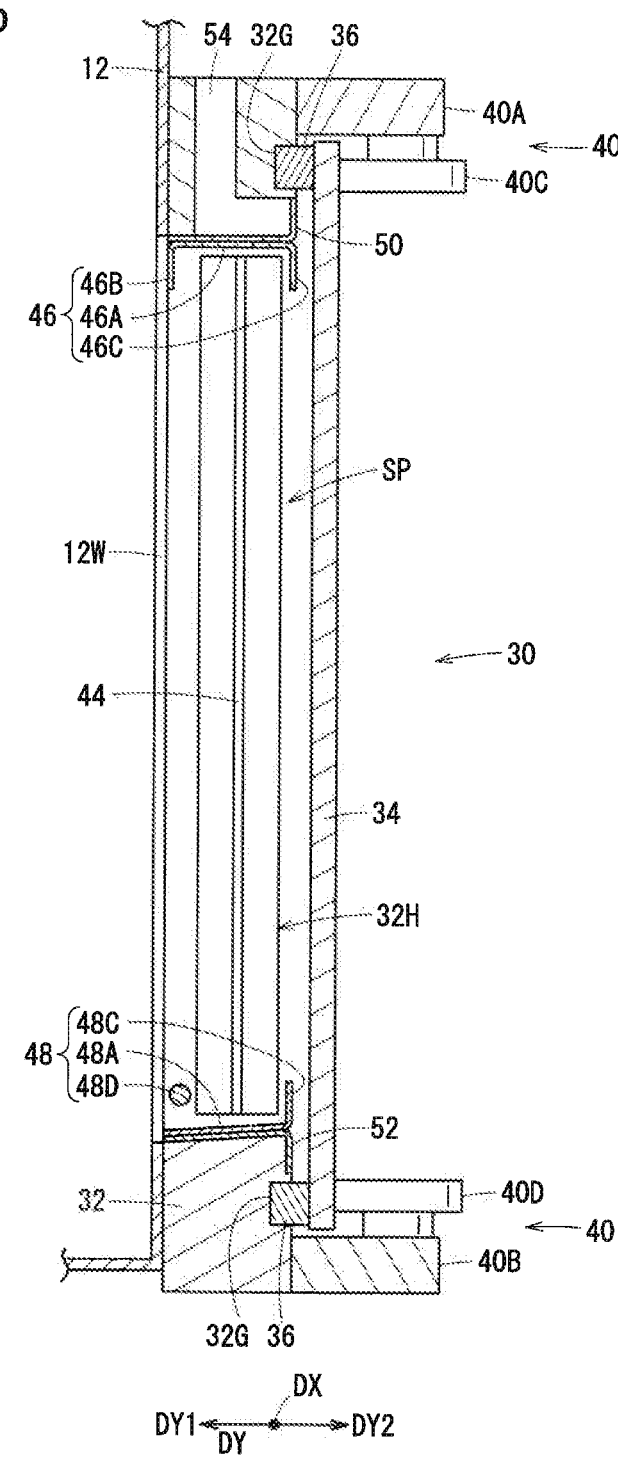
FIG. 5 is a view showing a sealing device according to a first modification from the same viewpoint as in FIG. 3.

FIG. 5 is a view showing a sealing device 30 according to a first modification from the same viewpoint as in FIG. 3. In FIG. 5, the same components as those described in the first embodiment are denoted by the same reference numerals. Moreover, in the present modification, descriptions that: overlap or are duplicative of those stated in the first embodiment will be omitted.

The lower guide rail member 48 of the present modification includes a side portion 48D instead of the side portion 48B (FIG. 3) of the first embodiment. The side portion 48D of the present modification extends in the first direction DX similarly to the side portion 48B (FIG. 3) of the first embodiment. On the other hand, unlike the side portion 48B of the first embodiment (FIG. 3), the side portion 48D of the present modification is disposed to be separated from the bottom portion 48A. Both ends of the side portion 48D are fixed to side surfaces of the seal base 32 that are on the inner peripheral side. Note that the cross-sectional shape of the side portion 48D of the present modification is not particularly limited. In FIG. 5, the cross-sectional shape of the side portion 48D of the present modification is a circular shape. The cross-sectional shape of the side portion 48D of the present modification may be a rectangular shape, a triangular shape, or the like.

In the present modification, the side portion 48D is disposed to be separated from the bottom portion 48A. With this configuration, compared to the case of the first embodiment in which the openings 48O are formed in the side portion 48B connected to the bottom portion 48A, it is possible to increase the degree of opening on the inward direction DY1 side in the lower guide rail member 48. As a result, the accumulation of sludge on the lower guide rail member 48 can be further suppressed.

Further, in the present modification, the bottom portion 48A of the lower guide rail member 48 is inclined so as to gradually separate away from the lower end of the bellows member 44 as the bottom portion extends in the inward direction DY1. Since the bottom portion 48A is inclined, it is possible to further suppress stagnation of sludge in the lower guide rail member 48 as compared with a case where the bottom portion 48A is not inclined.

As in the present modification, the bottom portion 48A of the first embodiment may be inclined so as to gradually separate away from the lower end of the bellows member 44 as the bottom portion 48A extends in the inward direction DY1. In addition, the lower sheet member 52 and the lower part of the inner peripheral surface of the seal base 32 of the second embodiment may be inclined so as to gradually separate away from the lower end of the bellows member 44 as they extend in the inward direction DY1. When the lower sheet member 52 of the second embodiment is omitted, only the lower part of the inner peripheral surface of the seal base 32 is inclined so as to separate away from the lower end of the bellows member 44, as the lower part extends in the inward direction DY1.

Modification 2

Figure 6:
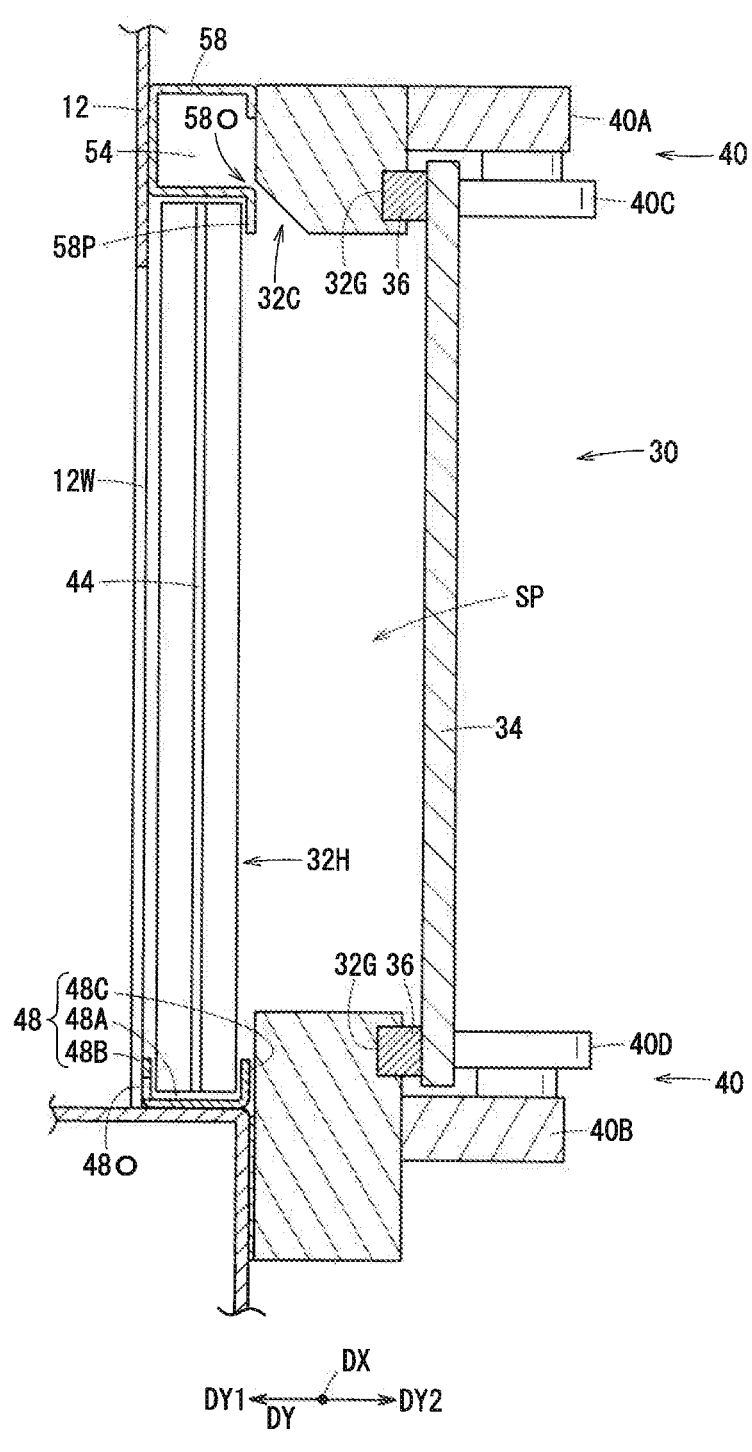
FIG. 6 is a view showing a sealing device according to a second modification from the same viewpoint as FIG. 3.

FIG. 6 is a view showing a sealing device 30 according to a second modification from the same viewpoint as in FIG. 3. In FIG. 6, the same components as those described in the first embodiment are denoted by the same reference numerals. Moreover, in the present modification, descriptions that overlap or are duplicative of those stated in the first embodiment will be omitted.

The bellows member 44 of the present modification is disposed in a region that lies on the inward direction DY1 side relative to the through hole 32H of the seal base 32. In the present modification, the upper sheet member 50 and the lower sheet member 52 are omitted. Further, in the present modification, a support base member 58 is newly provided.

The support base member 58 supports an upper portion of the bellows member 44. The support base member 58 is disposed between the side wall 12A of the work pan 12 and the seal base 32 above the through hole 32H. The support base member 58 extends along the first direction DX. The inward direction DY1 side of the support base member 58 is fixed to the work pan 12. The outward direction DY2 side of the support base member 58 is fixed to the seal base 32.

The support base member 58 is provided with a protrusion 58P. The protrusion 58P protrudes downward from the lower surface the support base member 58. The upper portion of the bellows member 44 is sandwiched between the protrusion 58P and the side wall 12A of the work pan 12. In the present modification, the upper guide rail member 46 (FIG. 3) is omitted. The support base member 58 of the present modification corresponds to the top portion 46A of the upper guide rail member 45 of the first embodiment. Further, the side wall 12A of the present modification corresponds to the side portion 46B of the upper guide rail member 46 of the first embodiment. Further, the protrusion 58P of the present modification corresponds to the side portion 46C of the upper guide rail member 46.

The flow path 54 is formed in the support base member 58. Further, an opening 58G is formed on the outward direction DY2 side of the support base member 58. The number of the openings 58O may be one or more. When there are a plurality of the openings 58O, the plurality of openings 58O are formed at intervals in the first direction DX. The opening 58O communicates with the quasi-closed space SP through a communication portion 32C formed in the seal base 32. That is, in the present modification, the opening 58O formed in the support base member 58 and the communication portion 32C formed in the seal base 32 are a part of the flow path 54.

As described above, even when the bellows member 44 is disposed in the region which lies on the inward direction DY1 side relative to the through hole 32H of the seal base 32, the sludge can be flowed out into the work pan 12 without sludge being retained in the lower guide rail member 48, as in the first embodiment. As in the present modification, the bellows member 44 of the second embodiment may be disposed in a region that lies on the inward direction DY1 side relative to the through hole 32H of the seal base 32.

Modification 3

The opening 48O may be provided in the bottom portion 48A instead of the side portion 48B of the lower guide rail member 48, or in addition to the side portion 48B of the lower guide rail member 48. In the case where the opening 48O is provided in the bottom portion 48A, a flow path is formed in the seal base 32 such that the opening 48O of the bottom portion 48A communicates with the work pan 12.

Modification 4

The groove 32G may be formed in the seal plate 34, instead of the seal base 32. In the case where the groove 32G is formed in the seal plate 34, the sliding portion 36 is provided so as to be slidable with respect to the seal base 32 while sealing a gap between the seal base 32 and the seal plate 34. That is, the sliding portion 36 may be a member that can slide with respect to the seal base 32 or the seal plate 34 while sealing the gap between the seal base 32 and the seal plate 34.

Modification 5

Although two bellows members 44 are provided in the above embodiments, one bellows member 44 may be provided. In the case where there is one bellows member 44, for example, the bellows member 44 is disposed in a region that lies on the inward direction DY1 side relative to the seal member 42. The bellows member 44 may be supported by the seal member 42 or a support member attached to the seal member 42.

Modification 6

The upper guide rail member 46 may be omitted. In the case where the upper guide rail member 46 is omitted, for example, a guide groove extending in the first formed on direction DX the upper sheet member 50 and the upper inner peripheral surface of the seal base 32. The upper portion of the bellows member 44 is fitted into the guide groove in a state Where the bellows member 44 can expand and contract.

Modification 7

The above-described embodiments and modifications nay be optionally combined as long as no technical inconsistency occurs.

Inventions

The following describes first invention, a second invention, and a third invention as inventions that can be grasped from the above-described embodiments and modifications.

First Invention

The first invention is characterized by the sealing device (30) configured to seal a window portion (12W) formed in the side wall (12A) of the work pan (12) that stores the working fluid in which a workpiece is immersed, wherein the lower arm (20) that supports the wire electrode (14) configured to machine the workpiece is inserted through the window portion and the window portion is formed so as to allow the work pan (12) to move in the intersecting direction (DX) that intersects the extending direction (DY) of the inserted arm (20). The sealing device (30) includes: the seal base (32) fixed to the outer surface of the work pan (12) and including the through hole (32H) communicating with the window portion (12W); the seal plate (34) configured to close the through hole (32H) from the outer surface side of the seal base (32) and provided so as to be movable relative to the seal base (32); the bellows member (44) disposed on the side of the inward direction (DY1) relative to the seal plate (34), so as to cover the window portion (12W), the inward direction (DY1) being a direction that extends from the outer side to the inner side of the window portion (12W) along the extending direction (DY), the bellows member (44) being configured to expand and contract along the intersecting direction (DX); the flow path (54) configured to allow the working fluid having a pressure higher than a pressure inside the work pan (12), to be supplied between the bellows member (44) and the seal plate (34); and the guide rail member (48) that is disposed on the lower side of the bellows member, extends in the intersecting direction (DX), and is configured to guide expansion and contraction of the bellows member (44). In the guide rail member (48), the inward direction (DY1) side of the guide rail member (48) is opened in a manner so that sludge generated by machining of the workpiece flows into the work pan (12) together with the working fluid supplied between the bellows member (44) and the seal plate (34).

This allows the working fluid supplied between the bellows member (44) and the seal plate (34) to flow into the work pan (12) through the opened portion. Therefore, it is possible to prevent the sludge from entering between the bellows member (44) and the seal plate (34), without causing the sludge to stagnate in the guide rail member (48), and as a result, it is possible to prevent the accumulation of the sludge.

The guide rail member (48) may include: the bottom portion (48A) disposed below the lower portion of the bellows member (44) and extending in the intersecting direction (DX); and the side portion (48B) that is disposed on the side of the inward direction (DY1) relative to the lower portion of the bellows member (44), extends in the intersecting direction (DX), and is connected to the bottom portion (48A), wherein the opening (48O) through which the sludge flows may be formed in at least one of the side portion (48B) or the bottom portion (48A). Thus, it is possible to prevent sludge from accumulating on the guide rail member (48), by flowing out the sludge through the opening (48O).

The opening (48O) may include a plurality of openings that are formed at intervals in the intersecting direction (DX). Thus, compared to a case where there is only one opening (48O), the degree of opening of the guide rail member (48) on the inward direction (DY1) side can be increased, while the strength of the guide rail member (48) being ensured. Therefore, the accumulation of sludge on the guide rail member (48) can be further suppressed.

The guide rail member (48) may include: the bottom portion (48A) disposed below the lower portion of the bellows member (44) and extending in the intersecting direction (DX); and the side portion (48D) extending in the intersecting direction (DX) and disposed on the side of the inward direction (DY1) relative to the lower portion of the bellows member (44) so as to be spaced apart from the bottom portion (48A) in order to allow the sludge to flow. Thus, compared to a case where the opening (48O) is formed in the side portion (48B) connected to the bottom portion (48A), the degree of opening of the guide rail member (48) on the inward direction (DY1) side can be increased. Therefore, the accumulation of sludge on the guide rail member (48) can be further suppressed.

The bottom portion (48A) may be inclined so as to gradually separate away from the lower end of the bellows member (44) as it extends in the inward direction (DY1). Thus, accumulation of sludge on the guide rail member (48) can be further suppressed as compared with the case where the bottom portion (48A) is not inclined.

Second Invention

The second invention is characterized by the sealing device (30) configured to seal a window portion (12W) formed in the side wall (12A) of the work pan (12) that stores the working fluid in which a workpiece is immersed, wherein the lower arm (20) that supports the wire electrode (14) configured to machine the workpiece is inserted through the window portion and the window portion is formed so as to allow the work pan (12) to move in the intersecting direction (DX) that intersects the extending direction (DY) of the inserted arm (20). The sealing device (30) includes: the seal base (32) fixed to the outer surface of the work pan (12) and including the through hole (32H) communicating with the window portion (12W); the seal plate (34) configured to close the through hole (32H) from the outer surface side of the seal base (32) and provided so as to be movable relative to the seal base (32); the bellows member (44) disposed on the side of the inward direction (DY1) relative to the seal plate (34), so as to cover the window portion (12W), the inward direction being a direction that extends from the outer side to the inner side of the window portion (12W) along the extending direction (DY), the bellows member (44) being configured to expand and contract along the intersecting direction (DX); the flow path (54) configured to allow the working fluid having a pressure higher than a pressure inside the work pan (12), to be supplied between the bellows member (44) and the seal plate (34); and the support rod (56) that penetrates through the lower portion of the bellows member (44) in a state in which the bellows member (44) is allowed to expand and contract, extends in the intersecting direction (DX), and is configured to support the bellows member (44).

This allows the working fluid supplied between the bellows member (44) and the seal plate (34) to flow into the work pan (12) from below the bellows member (44) without providing the guide rail member (48). Therefore, it is possible to prevent the sludge from entering between the bellows member (44) and the seal plate (34), without causing the sludge to stagnate. As a result, it is possible to prevent the sludge from accumulating.

Third Invention

The third invention is a wire electrical discharge machine (10). The wire electrical discharge machine (10) includes the above-described sealing device (30), the work pan (12), and the arm (20). Since the sealing device (30) is provided, the accumulation of sludge can be suppressed.

The invention claimed is:

1. A sealing device configured to seal a window portion formed in a side wall of a work pan that stores a working fluid in which a workpiece is immersed, wherein a lower arm that supports a wire electrode configured to machine the workpiece is inserted through the window portion and the window portion is formed so as to allow the work pan to move in an intersecting direction that intersects an extending direction of the inserted lower arm, the sealing device comprising:

a seal base fixed to an outer surface of the work pan and including a through hole communicating with the window portion;

a seal plate configured to close the through hole from an outer surface side of the seal base and provided so as to be movable relative to the seal base;

a bellows member disposed on a side of an inward direction relative to the seal plate, so as to cover the window portion, the inward direction being a direction that extends from an outer side to an inner side of the window portion along the extending direction, the bellows member being configured to expand and contract along the intersecting direction;

a flow path configured to allow the working fluid having a pressure higher than a pressure inside the work pan, to be supplied between the bellows member and the seal plate; and a guide rail member that is disposed on a lower side of the bellows member, extends in the intersecting direction, and is configured to guide expansion and contraction of the bellows member; wherein in the guide rail member, a side of the inward direction of the guide rail member comprises at least one of openings that is opened toward the inward direction or a downward direction in a manner so that sludge generated by machining of the workpiece flows out through the opening and flows into the work pan together with the working fluid supplied between the bellows member and the seal plate.

2. The sealing device according to claim 1, wherein the guide rail member includes: a bottom portion that is disposed below a lower portion of the bellows member and extends in the intersecting direction; and a side portion that is disposed on the side of the inward direction relative to the lower portion of the bellows member, extends in the intersecting direction, and is connected to the bottom portion, wherein an opening through which the sludge flows is formed in at least one of the side portion or the bottom portion.

3. The sealing device according to claim 2, wherein the opening comprises a plurality of openings that are formed at intervals in the intersecting direction.

4. The sealing device according to claim 2, wherein the bottom portion is inclined so as to gradually separate away from a lower end of the bellows member as the bottom portion extends in the inward direction.

5. The sealing device according to claim 1, wherein the guide rail member includes: a bottom portion disposed below a lower portion of the bellows member and extending in the intersecting direction; and a side portion extending in the intersecting direction and disposed on the side of the inward direction relative to the lower portion of the bellows member so as to be spaced apart from the bottom portion in order to allow the sludge to flow.

6. A wire electrical discharge machine comprising: a work pan configured to store a working fluid in which a workpiece is immersed; and a sealing device configured to seal a window portion formed in a side wall of the work pan, wherein the sealing device comprises: a seal base fixed to an outer surface of the work pan and including a through hole communicating with the window portion; a seal plate configured to close the through hole from an outer surface side of the seal base and provided so as to be movable relative to the seal base;

a bellows member disposed on a side of an inward direction relative to the seal plate, so as to cover the window portion, the inward direction being a direction that extends from an outer side to an inner side of the window portion along an extending direction of an arm that is inserted through the window portion, the bellows member being configured to expand and contract along an intersecting direction that intersects the extending direction of the arm;

a flow path configured to allow the working fluid having a pressure higher than a pressure inside the work pan, to be supplied between the bellows member and the seal plate; and a guide rail member that is disposed on a lower side of the bellows member, extends in the intersecting direction, and is configured to guide expansion and contraction of the bellows member, and wherein in the guide rail member, a side of the inward direction of the guide rail member comprises at least one of openings that is opened toward the inward direction or a downward direction in a manner so that sludge generated by machining of the workpiece flows out through the opening and flows into the work pan together with the working fluid supplied between the bellows member and the seal plate.

\* \* \* \* \*